US007643622B2

(12) United States Patent
Ito

(10) Patent No.: US 7,643,622 B2
(45) Date of Patent: Jan. 5, 2010

(54) COMMUNICATION DEVICE WITH COMMUNICATION CIRCUIT CONTROL SYSTEM

(75) Inventor: Tomohiro Ito, Mizuho (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 937 days.

(21) Appl. No.: 11/175,336

(22) Filed: Jul. 7, 2005

(65) Prior Publication Data

US 2006/0028990 A1 Feb. 9, 2006

(30) Foreign Application Priority Data

Jul. 7, 2004 (JP) ............................ 2004-200885

(51) Int. Cl.
*H04M 11/00* (2006.01)
(52) U.S. Cl. .............................. 379/93.09; 379/100.15
(58) Field of Classification Search .............. 379/93.09, 379/100.15, 100.16, 373.01, 377, 382
See application file for complete search history.

(56) References Cited

U.S. PATENT DOCUMENTS

| 4,145,577 | A | * | 3/1979 | Kojima et al. ............... 379/382 |
| 5,809,132 | A | | 9/1998 | Sakamoto |
| 6,005,923 | A | | 12/1999 | Lee |
| 6,141,414 | A | | 10/2000 | Mathe et al. |
| 6,456,703 | B1 | | 9/2002 | Lee |
| 2003/0048483 | A1 | | 3/2003 | Okabe |

FOREIGN PATENT DOCUMENTS

| JP | 02-294149 | 12/1990 |
| JP | 6-152797 | 5/1994 |
| JP | 06-205086 | 7/1994 |
| JP | 2770220 | 4/1998 |
| JP | 2833513 | 10/1998 |
| JP | 2890179 | 2/1999 |
| JP | 2921432 | 4/1999 |
| JP | 3008708 | 12/1999 |
| JP | 3008709 | 12/1999 |
| JP | 2002-515698 | 5/2002 |
| JP | 2003-51926 | 2/2003 |
| JP | 3396225 | 2/2003 |
| WO | WO 98/54886 | 12/1998 |
| WO | WO 99/59325 | 11/1999 |

OTHER PUBLICATIONS

Notification of Reasons of Rejection, Application No. 2004-200885, Ref. No. PBR02407, dtd Jun. 10, 2008.

* cited by examiner

*Primary Examiner*—Stella L Woo
(74) *Attorney, Agent, or Firm*—Banner & Witcoff, Ltd

(57) ABSTRACT

A communication device enables a voice communication with another communication device connected to a communication circuit network. The communication device has a calling signal detection system that detects whether a calling signal is received from the other communication device via the communication circuit network, a circuit closing system that is configured to close a circuit connecting the communication device and the other communication device when a communication starting operation is performed by a user after the calling signal detection system detects the calling signal from the other communication device, a state detection system that detects whether the calling signal currently received is in ON or OFF state, and a standby control system that controls the circuit closing system to await closing the circuit until the state detection system detects the OFF state of the calling signal if the state detection system detects the ON state of the currently received calling signal.

17 Claims, 7 Drawing Sheets

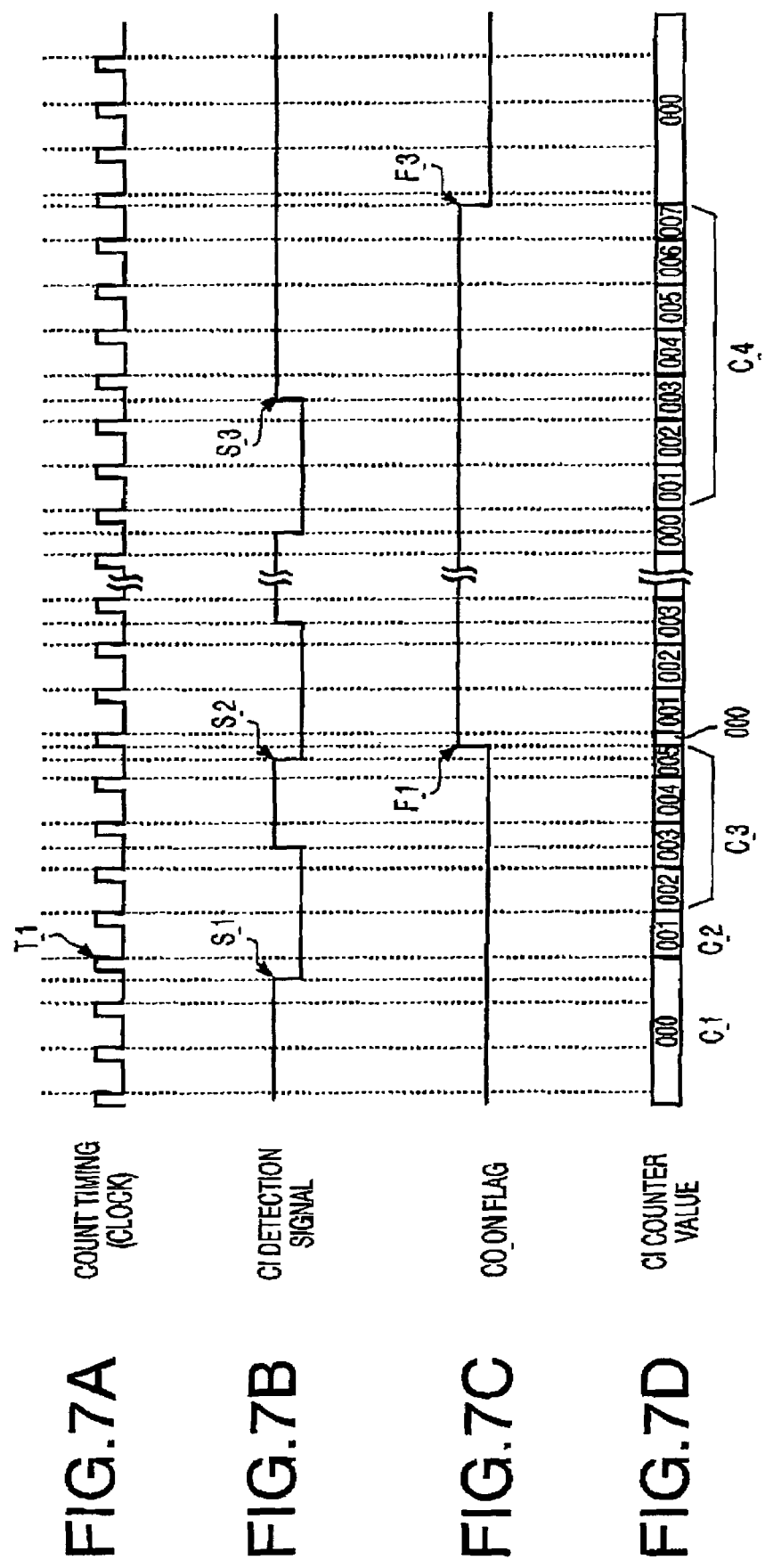

COMMUNICATION DEVICE WITH COMMUNICATION CIRCUIT CONTROL SYSTEM

CROSS REFERENCE TO RELATED APPLICATIONS

This application claims priority from Japanese Patent Application No. 2004-200885, filed on Jul. 7, 2004, the entire subject matter of the application is incorporated herein by reference.

BACKGROUND OF THE INVENTION

1. Technical Field

Aspects of the invention relate to a communication device (or a device having a communication function) that allows a voice communication to be performed with another communication device connected with a communication circuit network.

2. Related Art

Communication devices (e.g., a telephone) which allows a voice communication are well known. Such a communication device is typically configured as follows to realize the voice communication.

First, a communication device (calling station terminal) connected to a communication circuit network (e.g., a telephone circuit network) calls another communication device. Then, an exchanger of the communication circuit network transmits a CI (Call Indicator) signal for notifying a call to a called station terminal. The called station terminal outputs a ringing tone notifying a user of reception of a call in response to reception of the CI signal.

Thereafter, when the user of the called station terminal carries out an operation to start the communication, i.e., when the user picks up a hand set thereof as the ringing tone is output, the notification of the call with the CI signal from the communication circuit network is stopped, communication lines for the called station terminal and the calling station terminal are connected, thereby enabling a voice communication therebetween.

Specifically, in the called station terminal, when the operation to start the communication is carried out, a connection of an inner circuit to be connected to the communication circuit network is switched from a circuit that detects a reception of the CI signal to a circuit connected to the handset (i.e., a circuit used for transmitting/receiving voice signals). For example, with use of a relay (off-hook relay), a circuit including the handset must be closed. An example of such a configuration is disclosed in Japanese Patent Publication No. 3396225.

The notification using the CI signal as described above is stopped after the exchanger of the telephone circuit network has detected that the operation for starting the communication has been done at the called station terminal. Therefore, the CI signal may flow through the circuit including the handset when such an operation for starting the communication.

The CI signal is typically defined as a signal having an ON state and an OFF state which sequentially occur. When in the ON state, the CI signal has repeatedly alternating H (high) level and L (low) level, and in the OFF state, the CI signal has a continuous L level. If the communication start operation is carried out when the CI signal is in the OFF state, the pulses (i.e., alternating H and L levels) will not flow through the circuit. If the CI signal is in the ON state when the communication start operation is carried out, although within a very short period, the pulses constituting the CI signal flow through the circuit connected to the handset. In such a case, non-voice signal is output through the handset as an audible sound, which may provide an unpleasant noise to the user of the called station terminal.

Further, the amplitude of the pluses constituting the CI signal is generally greater than that of the voice signal exchanged during the voice communication. If the pluses are transmitted to the circuit to the handset, electronic elements included in the circuit may be damaged or broken as the signal level exceeds the durable voltages of the elements. Therefore, in view of protection of the circuit, it is also necessary to prevent the CI signal from flowing to the circuit.

SUMMARY

Aspects of the present invention provide an improved technology that prevents the CI signal from flowing to the circuit connected to the handset.

BRIEF DESCRIPTION OF THE ACCOMPANYING DRAWINGS

Figure 1:
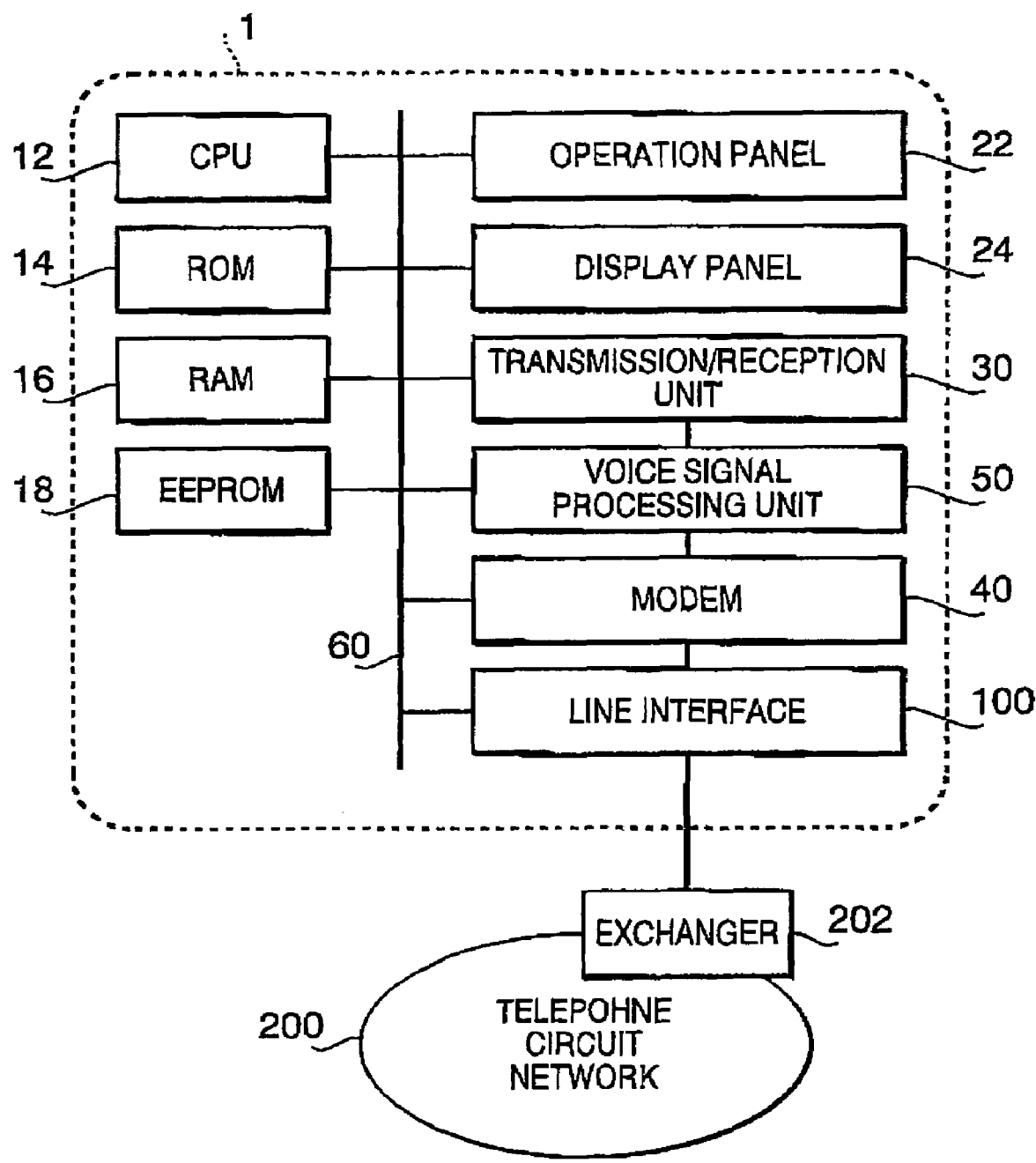
FIG. 1 is a block diagram showing a configuration of a telephone device according to an embodiment of the invention.

FIGS. 7A-7D constitute a timing chart showing a count timing signal, a CI detection signal, a CI_ON flag and a counter value of the CI counter in accordance with aspects of the present invention.

DETAILED DESCRIPTION

The following described general aspects of the invention that may or may not be included in various embodiments/modifications. Also, it is noted that various connections are set forth between elements in the following description. It is noted that these connections in general and, unless specified otherwise, may be direct or indirect and that this specification is not intended to be limiting in this respect.

General Overview of Aspects of the Invention

According to some aspects of the invention, there is provided a communication device enabling a voice communication with another communication device connected to a communication circuit network, which is provided with a calling signal detection system that detects whether a calling signal is received from the other communication device via the communication circuit network, a circuit closing system that is configured to close a circuit connecting the communication device and the other communication device when a communication starting operation is performed by a user after the calling signal detection system detects the calling signal from the other communication device, a state detection system that detects whether the calling signal currently received is in an ON state or an OFF state, and a standby control system that controls the circuit closing system to await closing the circuit until the state detection system detect the OFF state of the calling signal if the communication starting operation is performed by the user after the calling signal detection system detects the calling signal from the other communication device, and the state detection system detects the ON state of the currently received calling signal.

The circuit closing system may operate to close the circuit if the communication starting operation is performed by the user after the calling signal detection system detects the calling signal from the other communication device, and the state detection system detects the OFF state of the currently received calling signal.

The standby control system may control the circuit closing system to await closing the circuit for a predetermined standby period after the state detection system detects the OFF state of the calling signal.

The state detection system may detect that the calling signal is in the ON state if a period of pulse signal constituting the calling signal is shorter than a predetermined time period. The state detection system may detect that the calling signal is in the OFF state if a period of pulse signal constituting the calling signal is equal to or longer than the predetermined time period.

According to other aspects, there is provided a method of closing a circuit that is configured to include a communication device and another communication device via a communication circuit network therebetween, a voice communication being enabled between the communication device and the other communication device via the communication circuit network when the circuit is closed, the method comprising the steps of first detecting whether a calling signal is received from the other communication device via the communication circuit network, second detecting whether the calling signal currently received is in an ON state or an OFF state if a communication starting operation is performed by a user after the first detecting detects the calling signal, awaiting closing of the circuit if the second detecting detects the ON state of the calling signal, and allowing the closing of the circuit if the second detecting detects the OFF state of the calling signal.

The awaiting step may further await the closing of the circuit for a predetermined standby period after the state detection system detects the OFF state of the calling signal.

The second detecting step may detect whether the calling signal currently received is in the ON state or the OFF state based on a period of a pulse signal constituting the calling signal.

The second detecting step may detect that the calling signal is in the ON state if a period of pulse signal constituting the calling signal is shorter than a predetermined time period. The second detecting step may detect that the calling signal is in the OFF state if a period of pulse signal constituting the calling signal is equal to or longer than the predetermined time period.

According to further aspects, there is provided a program product having computer accessible instructions that cause a computer to carry out a method of closing a circuit that is configured to include the computer serving as a communication device and another communication device via a communication circuit network therebetween, a voice communication being enabled between the communication device and the other communication device via the communication circuit network when the circuit is closed. The instruction may define the steps of first detecting whether a calling signal is received from the other communication device via the communication circuit network, second detecting whether the calling signal currently received is in an ON state or an OFF state if a communication starting operation is performed by a user after the first detecting detects the calling signal, awaiting closing of the circuit if the second detecting step detects the ON state of the calling signal, and allowing the closing of the circuit if the second detecting detects the OFF state of the calling signal.

The awaiting steps may further await the closing of the circuit for a predetermined standby period after the state detection system detects the OFF state of the calling signal.

The second detecting steps may detect whether the calling signal currently received is in the ON state or the OFF state based on a period of a pulse signal constituting the calling signal.

The second detecting step may detect that the calling signal is in the ON state if a period of pulse signal constituting the calling signal is shorter than a predetermined time period, and that the calling signal is in the OFF state if a period of pulse signal constituting the calling signal is equal to or longer than the predetermined time period.

According to furthermore aspects, there is provided a communication device enabling a voice communication with another communication device connected to a communication circuit network, which is provided with a circuit closing system that is configured to close a circuit connecting the communication device and the other communication device, a calling signal detection system that detects whether a calling signal is received from the other communication device via the communication circuit network, a notifying system that notifies a user of receipt of the calling signal, an operable member that enables the user to carry out a communication starting operation when the notifying system notifies of the receipt of the calling signal, a state detection system that detects whether the calling signal currently received is in an ON state or an OFF state after the user has operated the operable member to carry out the communication starting operation, and a closing control system that controls the circuit closing system to await closing the circuit if the communication starting operation has been carried out and the state detection system detects the ON state of the currently received calling signal, the closing control system allowing the closing of the circuit if the communication starting operation has been carried out and the state detection system detects the OFF state of the currently received calling signal.

The closing control system may control the circuit closing system to await closing the circuit for a predetermined period after the state detection system has detected the OFF state of the calling signal.

The state detection system may detect whether the calling signal currently received is in the ON state or the OFF state based on a period of a pulse signal constituting the calling signal.

The state detection system may detect that the calling signal is in the ON state if a period of pulse signal constituting the calling signal is shorter than a predetermined time period, and that the calling signal is in the OFF state if a period of pulse signal constituting the calling signal is equal to or longer than the predetermined time period.

EMBODIMENT

Hereinafter, referring to the accompanying drawings, a telephone terminal 1 according to an embodiment of the invention will be described.

The telephone terminal 1 includes, as shown in FIG. 1, a CPU (Central Processing Unit) 12, a ROM (Read Only Memory) 14, a RAM (Random Access Memory) 16, an EEPROM (Electrically Erasable Programmable ROM) 18, an operation panel 22, a display panel 24, a transmission/reception unit 30, a modem 40, a voice signal processing unit 50, and a line interface unit 100, which are interconnected through a bus line 60.

The CPU 12 controls the entire operation of the telephone terminal 1 in accordance with procedures stored in the ROM 14 (in a form of programs) and with storing results in the RAM 16. The EEPROM 18 stores information regarding operational settings of the telephone terminal 1.

Figure 2:
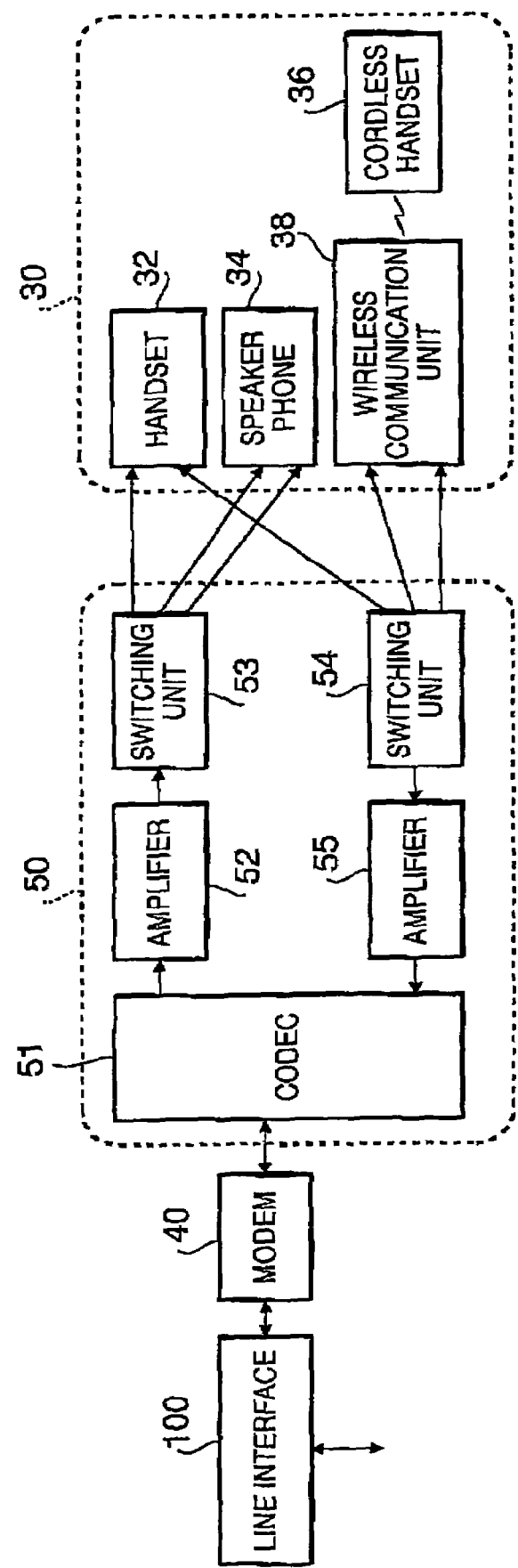
FIG. 2 is a block diagram showing a detailed configuration of a part of the telephone device shown in FIG. 1 in accordance with aspects of the present invention.
Figure 3:
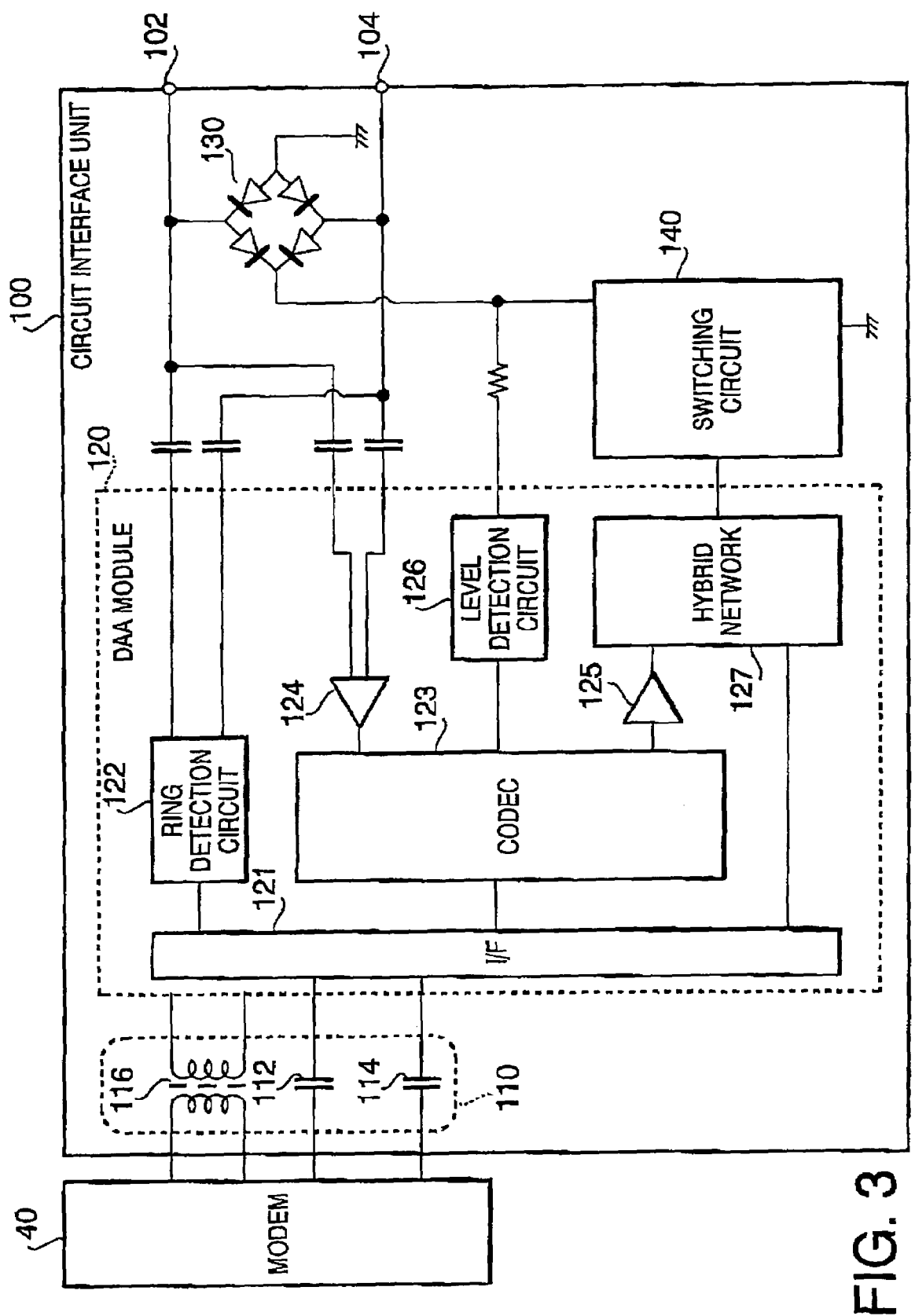
FIG. 3 is a block diagram showing a circuit of a line interface unit of the telephone device shown in FIGS. 1 and 2 in accordance with aspects of the present invention.

The transmission/reception unit 30 includes, as shown in FIG. 2, a handset 32 which is picked up from a main body of the telephone terminal 1. When in use, a speaker-phone enables a so-called hands-free telephone conversation using a wireless communication unit 38 that transmits/receives, by radio, various signals including the voice signal to enable a wireless communication with cordless handsets 36.

The modem 40 connects the voice signal processing unit 50 and the line interface unit 100 so that they can communicate with each other. Specifically, the modem 40 receives the voice signal output by the voice signal processing unit 50 and transmits the same to the line interface unit 100. The modem 40 also receives the voice signal output by the line interface 100 and transmits the same to the voice signal processing unit 50.

As shown in FIG. 2, the voice signal processing unit 50 includes a CODEC 51 (that receives an analog voice signal output by the transmission/reception unit 30 (from an amplifier 55, which will be described later)), converts the received analog voice signal to a digital voice signal and transmits the same to the modem 40, and also receives the digital voice signal output by the modem 40 and converts the received digital voice signal to the analog signal and transmits the same to the transmission/reception unit 30 (to an amplifier 52). The voice signal processing unit 50 further includes the amplifier 52 (that receives the voice signal output by the CODEC 51 and transmits the amplified voice signal to the transmission/reception unit 30 (to the switching unit 53)), the switching unit 53 (that receives the voice signal output by the amplifier 52 and transmits the same to one of the handset 32), speaker phone 34 and wireless communication unit 38, selectively, a switching unit 54 (that selectively receives the voice signal output by the handset 32), speaker phone 34 and wireless communication unit 38, and an amplifier 55 (that amplifies the voice signal received by the switching unit 54 and outputs the amplified voice signal to the CODEC 51).

Each of the switching units 53 and 54 is not connected to any one of the handset 32, speaker phone 34 and wireless communication unit 38 in its initial state, and thus no voice signal is received/transmitted. When an instruction is received from the CPU 12, each of the switching units 53 and 54 is connected to the handset 32, speaker phone 34 and wireless communication unit 38 so that the voice signal can be received/transmitted.

The line interface 100 is connected to the telephone line network 200 via connection terminals 102 and 104. The line interface 100 includes a separation unit 110 (that separates the line interface from the modem 40 so that a direct current signal is transmitted between the modem 40), a DAA (Data Access Arrangement) module 120 (which exchanges the voice signal with the modem 40 via the separation unit 110), a diode bridge 130 (that converts an alternating current signal from the telephone circuit network 200 to a direct current signal), and a switching circuit 140 (that opens/closes a path directed from the telephone circuit network 200 to the transmission/reception unit 30 (i.e., the DAA module 120)).

Among the above units/modules, the separation unit 110 is insulated from the direct current. That is, the separation unit 110 is provided with condensers 112 and 114, with which the direct current does not flow between the modem 40 and the DAA module 120. Further, the separation unit 110 is provided with a power transformer 116 that supplies an electrical power to the DAA module 120 through the modem 40.

The DAA module 120 is an integrated circuit including an interface unit (I/F) 121 (which is connected to the modem 40 via the separation unit 110), a ring detection circuit 122 (which detects the CI signal through connection ports 102 and 104), a CODEC 123 (which converts the analog voice signal input through the connection terminals 102 and 104 into a digital voice signal and transmits the converted digital signal to the interface unit 121 and converts the digital voice signal received from the interface unit 121 into the analog voice signal and outputs the converted signal through the connection terminals 102 and 104 (to a transmission amplifier 125, which will be described blow)), a reception amplifier 124 (which is a differential amplifier amplifying a difference between the signal levels of the analog voice signals input through the connection terminals 102 and 104 and transmits the amplified signal to the CODEC 123), the transmission amplifier 125 (which amplifies the analog voice signal output by the CODEC 123 and outputs the amplified signal through the connection terminals 102 and 104 (to a hybrid network 127 described later)), a level detection circuit 126 (that detects a signal level of a signal input to the DAA module 120 and outputs the detection signal to the CODEC 123), and the hybrid network 127 (which receives the voice signal from the CODEC 123 through the transmission amplifier 125 and outputs the signal through the connection terminals 102 and 104).

The telephone terminal 1 according to the embodiment employs the DAA module 120, which is the integrated circuit. The telephone terminal 1 can be downsized and the manufacturing cost thereof can be reduced.

Figure 4A:
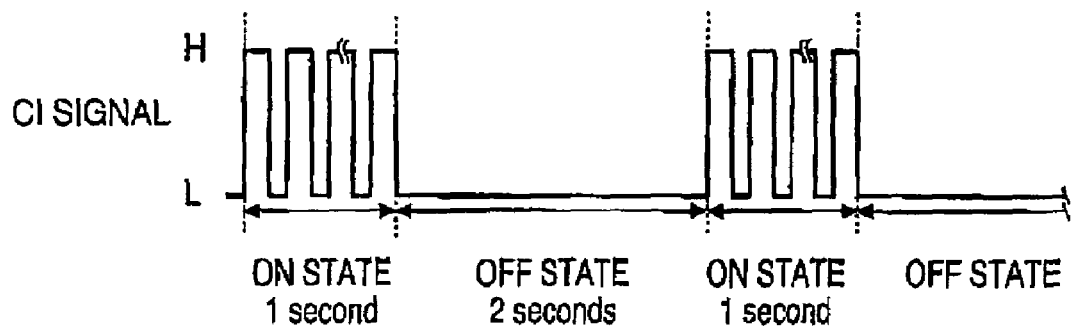
FIGS. 4A and 4B show waveforms of a CI signal and CI detection signal in accordance with aspects of the present invention.
Figure 4B:
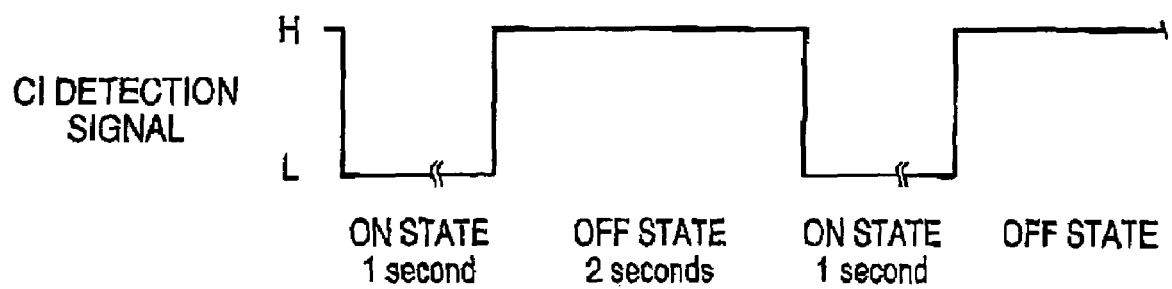

In the DAA module 120, the ring detection circuit 122 electrically separates the connection terminal 102 and 104 from the interface unit 121 with a photo coupler. The CI signal applied to the connection terminals 102 and 104 is detected, and the CI detection signal is input to the CPU 12 via the interface unit 121. For example, the CI signal has an ON state in which a pulse rises repeatedly (i.e., the H and L levels alternately and repeatedly appear) at a predetermined period ($\frac{1}{16}$ sec in the embodiment) and an OFF state in which the pulse stays at the H level, with the durations of the ON state to the OFF state is a:b, where a<b (in the illustrative embodiment, a=1 sec. and b=2 sec.) as shown in FIG. 4A. The ring detection circuit 122 outputs a negative-logic CI detection signal which has an L level in the ON state and an H level in the OFF state as shown in FIG. 4B.

The hybrid network 127 controls the switching circuit 140 to close the circuit in response to a command issued by the CPU 12. Further, the CPU 12 changes the resistance values on the connection terminals 102 and 104 side via the switching circuit 140 so that the signal level of the voice signal which flows the paths to the connection terminals 102 and 104.

The switching circuit 140 opens the path directed from the diode bridge 130 to the DAA module 120 (hybrid network 127) in its initial state. Upon instruction from the CPU 12, the switching circuit 140 connects the path (from the diode bridge 130 to the DAA module 120) to form a closed loop with the telephone circuit network 200 (including the closest exchanger 202) so as to close the circuit.

Hereinafter, a voice communication procedure executed by the CPU 12 will be described referring to FIG. 5.

The voice communication procedure is repeatedly executed after the telephone terminal 1 is powered ON.

After the procedure is started, control waits for reception of the CI signal (S110: NO). When the CI signal is received (S110: YES), a ringing tone is output (S120). In step S110, when the DAA module 120 (ring detection circuit 122) of the line interface unit 100 detects the CI signal, the CI detection signal is output by the line interface 100. Thus, control determines that the CI signal is received when the CI detection signal is output by the line interface 100.

In S120, a ringtone stored in the EEPROM 18 is output by the transmission/reception unit 30 (through a speaker of the speaker phone 34).

In S130, control pauses until the OFF hook operation is carried out (S130: NO). It should be noted that the "OFF hook" operation, at least in this specification, means an operation of starting a telephone communication to realize the voice communication specifically, the OFF hook operation is an operation to pick up the handset 32 from the transmission/reception unit 30, an operation of the operation panel 22 to start the voice communication using the speaker phone 34, or the wireless handset 36 is operated to start the voice communication (in this case, a signal indicating that such an operation is executed is transmit by the cordless handset 36 and received by the wireless communication unit 38).

When control determines that the OFF hook operation has been carried out (S130: YES), control stops, in S140, outputting the ringtone which has been started to be output in S120. Thus, the ringtone, which has been started to be output in S120, is stopped from being output through the transmission/reception unit 30 (through the speaker phone 34).

In S150, control checks a flag CI_ON, which is stored in a predetermined area of the RAM 16. The CI_ON flag has been set to "0" in its initial state, and is set to "1" when the CI signal is determine to be in the ON state in a CI detection procedure (FIG. 6), which will be described later, while set to "0" if the CI signal is in the OFF state.

In S160, control judges whether the CI_ON flag, which is checked in S150, is set to "1". If the CI_ON flag is set to "1", that is, if the CI signal is in the ON state (S160: YES), control returns to S150. If the CI_ON flag is not set to "1", that is the CI signal is in the OFF state (S160: NO), control judges whether a predetermined pausing time period has elapsed (S170). The time period represents a period after the OFF hook operation was detected in S130 using a timer built in the CPU 12. If the time period reaches a predetermined time period (e.g., 90 msec in the embodiment), the control judges that the predetermined pausing time period has elapsed. It should be noted that the predetermined pausing time period is determined as a period in which a transition period of the CI signal changing to the OFF state is passed and OFF state is stable.

If the measured time period has not reached the predetermined pausing time period (S170: NO), control returns to S150. If the measure time period exceeds the pausing time period (S170: YES), the telephone circuit with respect to the calling telephone terminal is closed (S180) Specifically, the switching circuit 140 of the line interface 100 is controlled to electrically connect the path from the diode bridge 130 to the DAA module 120 (hybrid network 127) to close the circuit with respect to the telephone circuit network 200 (exchanger 202). With this operation, the telephone lines of the telephone terminal 1 and the calling station terminal are closed via the telephone circuit network 200.

In S190, the voice communication is started. Specifically, the switching units 53 and 54 of the voice signal processing unit 50 are controlled to connect one of the handset 32, speaker phone 34 and cordless handset 36, which corresponds to the OFF hook operation carried out in S130, and the amplifiers 52 and 55 of the voice signal processing unit 50 are connected. With this operation, the transmission/reception unit 30 and the voice signal processing unit 50 are connected, and the voice communication can be started.

Next, control pauses until the ON hook operation is carried out (S200: NO). Specifically, the ON hook operation is an operation to return the handset 32 on the main body of the telephone terminal 1 if the OFF hook operation in S130 is the operation to pick up the handset from the telephone terminal; the OFF hook operation is an operation to finish the voice communication using the speaker phone 34 if the OFF hook operation in S130 is the operation to start the voice communication using the speaker phone 34; and an operation to finish the voice communication using the cordless handset 36 if the OFF hook operation in S130 is the operation to start the voice communication using the cordless handset 36.

If the ON hook operation is detected (S200: YES), control finishes the voice communication (S210). Specifically, the switching units 53 and 54 of the voice signal processing unit 50 are controlled to disconnect from the amplifiers 52 and 55 of the voice signal processing unit 50. With this operation, the connection between the transmission/reception unit 30 and the voice signal processing unit 50 is released, and the voice communication is finished.

After the circuit connected with the calling station terminal is opened (S220), control returns to S110. In S220, process controls the switching circuit 140 of the line interface unit 100 to open the path directed from the diode bridge 130 to the DAA module 120 (hybrid network 127) to open the circuit with respect to the telephone circuit network 200 (exchanger 202). With the above operation, the telephone line connecting the calling terminal and the telephone terminal 1 through the telephone circuit network 200 is opened.

Figure 6:
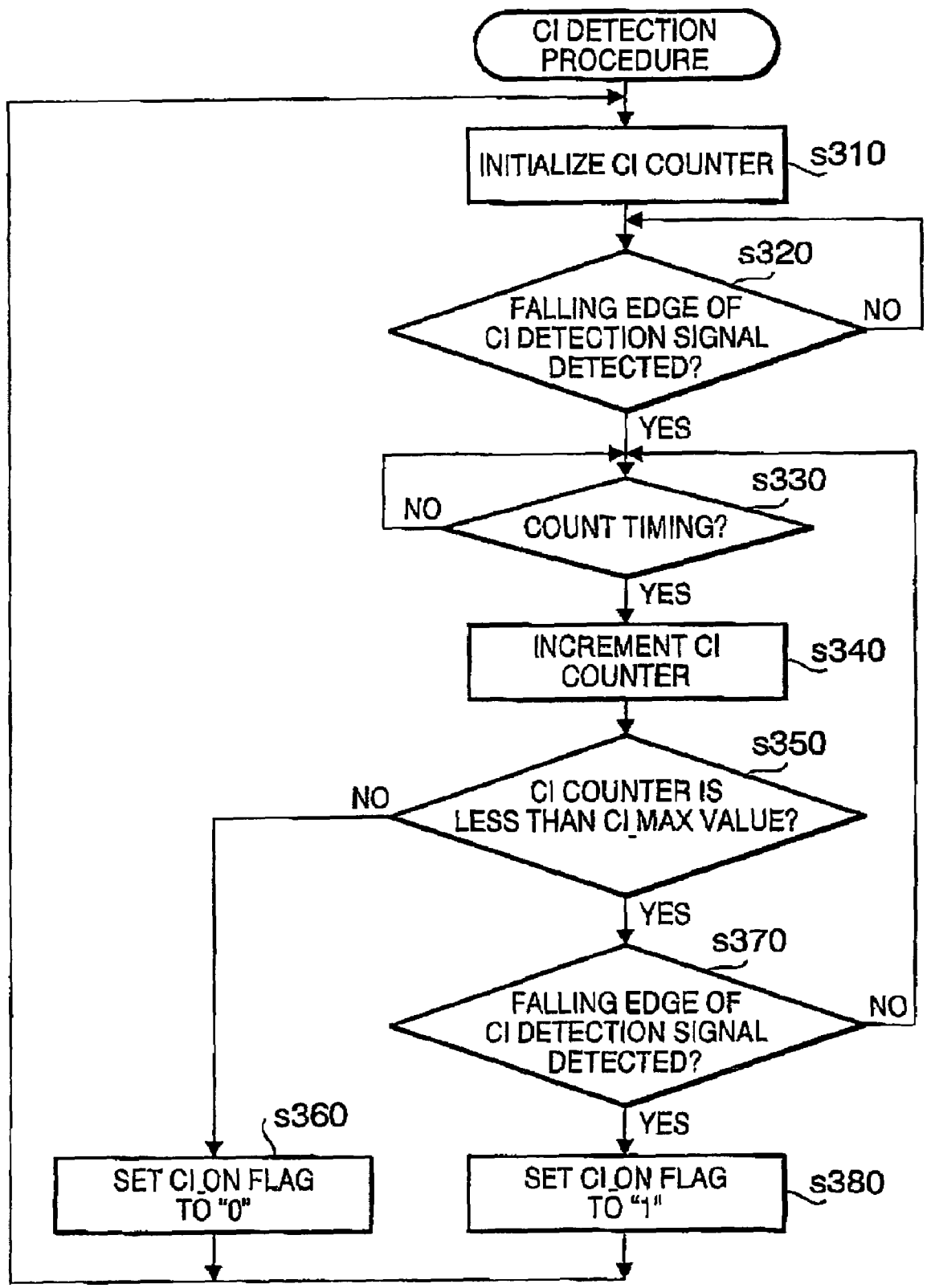
FIG. 6 is a flowchart illustrating a CI detection procedure in accordance with aspects of the present invention.

Referring to FIG. 6, the CI detecting procedure will be described in detail. The CI detection procedure is repeatedly executed after the telephone terminal 1 is powered ON.

Firstly, a CI counter stored in the RAM 16 is initialized (i.e., set to zero) in S310. Then, monitoring the CI detection signal which is detected by the DAA module 120 (ring detection circuit 122) of the line interface unit 100 is started. Until a falling edge of the CI detection signal is detected, the telephone terminal 1 is set to a standby state (S320: NO). As described above, the CI detection signal is the L level when the CI signal is in the ON state, while the CI detection signal is the H level when the CI signal is in the OFF state. Therefore, to keep the standby state until detection of the falling edge is detected is to keep the standby state until the CI detection signal falls down to be the L level, i.e., until the CI signal is in the ON state.

If the falling edge of the CI detection signal is detected (S320: YES), the telephone terminal 1 is set to operate in the standby mode until it becomes the count timing of the CI counter (S330: NO). In the embodiment, as shown in FIG. 7, the status of the CI detection signal is monitored based on a clock having a shorter period than a period of the pulses included in the CI signal in its ON state, and a timing when the clock counts down is regarded as the count timing.

In S330, at the count timing of the CI counter (S330: YES), the CI counter is incremented by one (S340).

Next, control judges whether the count value of the CI counter is less than a maximum value (CI_MAX value) (S350). The maximum value (CI_MAX value) is a value slightly greater than a maximum value that is expected to be counted up during a period when the CI signal is in the ON state. In the embodiment, the maximum value is six (6) and the maximum value (CI_MAX value) is seven (7). If the counted value is less than the maximum value (CI_MAX value), it is understood that the CI signal is in the ON state. On the other hand, since the OFF state of the CI signal continues longer than the ON state of the CI signal (see FIG. 4A), if the count value is greater than the maximum value (CI_MAX value), it is known that the CI signal is in the OFF state.

In S350, if the count value of the CI counter is less than the maximum value (CI_MAX value) (S350: YES), control judges whether the falling edge of the CI detection signal is detected (S370). It is checked whether the CI detection signal falls down and is in the ON state. Since the detection in S370 is a detection after the detection of the falling edge in S320 or in S360 that is previously executed. Thus, in S370, it is detected whether a period during which the CI signal in the ON state is changed to a next ON state has passed.

If, in S370, the falling edge of the CI detection signal has not been detected, that is, if one period of the CI signal has not elapsed (S370: NO), process turns to S330 and repeats counting with the CI counter. If the falling edge of the CI detection signal has been detected, that is, if one period of the CI signal has elapsed (S370: YES), process sets a CI_ON flag to one (1) in S380, and returns to S310.

The change of the CI_ON flag and count value of the CI counter in the CI detection procedure after the CI signal is received will be described referring to FIG. 7. In the flowing explanation, reference symbols in parentheses represent positions designated by the same symbols in FIG. 7, respectively.

After the CI counter is initialized in S310, process is in the standby state until the falling edge of the CI detection signal is detected (i.e., until S_1) in S320. During the standby state, steps of S330 onwards will not be executed, and accordingly, the count value of the CI counter will not be changed (C_1).

If the falling edge of the CI detection signal is detected in S320 during the standby state, that is, if the reception of the CI signal has been started (after S_1), the telephone terminal 1 is in the standby state before the count timing is judged in S330. According to the example shown in FIG. 7, the telephone terminal 1 is in the standby state by the falling down (T_1) of the clock, the CI counter is incremented in S340 (C_2). Thereafter, until the subsequent falling edge (S_2) of the CI detection signal is detected in S370, steps S330-S370 are repeated and the CI counter is counted subsequently (C_3).

If the falling edge of the CI detection signal is detected in S370 while the steps S330-S370 are repeatedly executed, process sets the CI_ON flag to one (1) (F_1) in S380. Thereafter, while the CI signal is in the ON state, the falling edge of the CI detection signal is always detected when the count value of the CI counter is less than the maximum value (CI_MAX value). Therefore, process does not move to S360, and steps S310-S380 are repeated, thereby the CI_ON flag being maintained to be one (1) (after F_1).

Next, when the CI signal is in the OFF state (after S_3), the falling edge of the CI detection signal will not be detected in S370, for a certain period of time, during repeated executions of steps S330-S370, and thus, the CI counter is repeatedly incremented in S340 until the CI counter equals to or exceeds the maximum value (CI_MAX value) (C_4).

In the above situation, during the repeated executions of steps S330-S370, process determines that the CI counter is not the maximum value (CI_MAX value) in S350. Then, process proceeds to S360, where the CI_ON flag is set to zero (0) (F_3). Thereafter, the similar processes are executed repeatedly.

When the CI_ON flag is set to zero (0), as above, process proceeds, in the voice communication procedure (FIG. 5), to S170 and the circuit is closed. However, if the CI_ON flag is set to one (1), process cannot proceed to S170 and pauses until the CI_ON flag is turned to zero. Therefore, during such a period, the circuit will not be closed.

According to the telephone terminal 1 configured as above, when the user carries out the OFF hook operation (i.e., an operation to start communication) in response to a call from another telephone terminal, if the CI signal is in the ON state, the circuit will not be closed (FIG. 5, S180) since the CI_ON flag is set to one in S380 of FIG. 6. The circuit will not be closed until the CI signal is in the OFF state and the CI_ON flag is set to zero in S360 of FIG. 6. Therefore, the CI signal in the ON state will not flow in inner circuits other than the circuit (i.e., ring detection circuit 122) regarding detection of the CI signal.

Thus, it is possible to prevent output of the CI signal as unpleasant noise sound from the transmission/reception unit 30 as the CI signal in the ON state flows in the circuit connected to the transmission/reception unit 30.

Further, after the CI signal is in the OFF state, the circuit will not be closed until the CI_ON flag is set to zero in S360 of FIG. 6. Therefore, the CI signal in the ON state will not flow through the inner circuits other than the circuit regarding detection of the CI signal (i.e., the ring detection circuit 122).

Thus, the CI signal in the ON state will not flow through the circuit connected to the transmission/reception unit 30 and thus it is possible to prevent the CI signal from being output by the transmission/reception unit 30 as unpleasant sound.

If the signal level of the CI signal in the ON state is greater than the level of a signal to be flown in the circuit connected to the transmission/reception unit 30, the durable voltages of electronic elements of the circuit should be sufficiently greater than the signal level of the CI signal. Otherwise, it may be possible that the electronic elements may be damaged or broken if the CI signal is applied thereto. If the above-described configuration, i.e., a configuration that can prevent the flow of the CI signal in the ON state, is employed, the damage of the electronic elements may be prevented. Additionally, in such a case, the circuit connected to the transmission/reception unit 30 can be designed without taking the signal level of the CI signal into account.

Figure 5:
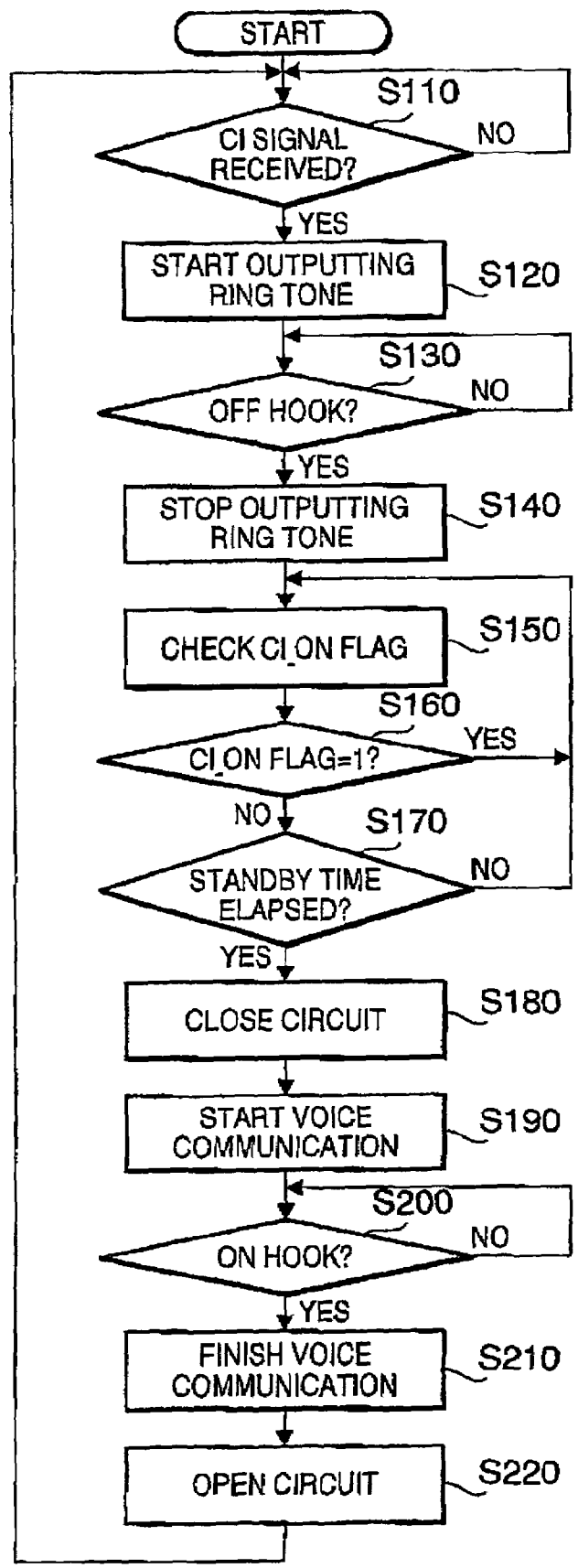
FIG. 5 is a flowchart illustrating a voice communication procedure in accordance with aspects of the present invention.

When the OFF hook operation is carried out after receipt of the CI signal is detected, if process determines that the CI_ON flag is zero (0) in S160 of FIG. 5, i.e., if the CI signal is in the OFF state, the CI signal in the ON state will not flow in the circuit inside the telephone terminal 1. Therefore, in this case, process close the circuit (S180) immediately after a pause in S170, without awaiting the CI_ON flag to be changed to zero (0).

In S170 of FIG. 5, process can await for a predetermined period before the circuit is closed, after the CI_ON flag is turned to zero (0), i.e., the CI signal turns to the OFF state. The predetermined period (standby period) is determined to be a period during which a transit period when the CI signal is changed to the OFF state has passed and stabled. If an unstable signal at the transit period flows through the inner circuit, the unpleasant noise may be output by the transmission/reception unit 30, or elements of the inner circuit may be damaged/broken. By providing the standby period as above, such a problem can be avoided.

In the CI detection procedure shown in FIG. 6, the period of the CI signal (i.e., an interval between adjacent falling edges) is counted with the CI counter, and if the count value equals to or exceeds the maximum value (i.e., the CI_MAX value), which is an unallowable value as the period for the ON state signal, process sets the CI_ON flag to zero (0) and determines (detects) that the CI signal is the OFF state. That is, based on whether the period of the CI signal is less than a period that is not allowable for the ON state period, process appropriately determines whether the CI signal is in the ON state (i.e., the CI_ON flag equals to one) or it is in the OFF state (i.e., the CI_ON flag equals to zero).

MODIFIED EMBODIMENT

In the foregoing, the telephone terminal 1 according to the first embodiment of the invention is described in detail. It should be noted that the above embodiment is an example of illustrative configurations and the invention need not be limited to the above-described configuration, but can be modified in various ways without departing scopes of the invention.

For example, in the above embodiment, as the communication device, the telephone terminal 1 is illustrated. It should be appreciated that the communication device according to aspects of the invention may be other devices that enable the voice communication through the telephone circuit network 200. Examples of such devices are a facsimile machines and MFP (Multi Function Peripheral) having a facsimile function. When aspects of the invention are applied to a device having the facsimile function, the CPU 12 is capable of carrying out the facsimile transmission/reception function based on signals transmitted/received through the interface unit 100. Further, the modem 40 may be configured to transmit/receive not only the voice signal, but a facsimile signal.

In the above-described embodiment, the period of the CI signal is counted by the increment of the CI counter synchronously with the clock. The configuration to count the period of the CI signal need not be limited to this configuration, and for example, a timer may be used to count (measure) the period.

In the embodiment, as an example, the initial value of the CI_ON flag is zero (see FIG. 7). This may be modified such that the initial value of the CI_ON flag is one. In this case, even when the operation to start communication is carried out when the CI_ON flag is in the initial state (i.e., equals to one), the circuit will not be closed with the CI signal is in the ON state since the CI_ON flag is one (1).

What is claimed is:

1. A communication device enabling a voice communication with another communication device connected to a communication circuit network, comprising:
    a calling signal detection system that detects whether a calling signal is received from the other communication device via the communication circuit network;
    a communication starting operation receiving system configured to receive a communication starting operation performed by a user after the calling signal detection system detects the calling signal from the other communication device;
    a circuit closing system configured to close a circuit connecting the communication device and the other communication device when the communication starting operation receiving system receives the communication starting operation performed by the user after the calling signal detection system detects the calling signal from the other communication device;
    a state detection system that detects whether the calling signal being received is currently in an ON state or an OFF state; and
    a standby control system that controls the circuit closing system to await closing the circuit until the state detection system detects the OFF state of the calling signal being received if the state detection system detected the ON state of the calling signal being received after the communication starting operation receiving system received the communication starting operation performed by the user.

2. The communication device according to claim 1, wherein the standby control system controls the circuit closing system to close the circuit without waiting if the state detection system detects the OFF state of the calling signal being received after the communication starting operation receiving system receives the communication starting operation performed by the user.

3. The communication device according to claim 1, wherein the standby control system controls the circuit closing system to await closing the circuit for a predetermined standby period after the state detection system detects the OFF state of the calling signal being received after the communication starting operation receiving system receives the communication starting operation performed by the user.

4. The communication device according to claim 1, wherein the state detection system detects that the calling signal being received is in the ON state if a period of pulse signal constituting the calling signal is shorter than a predetermined time period, and
    wherein the state detection system detects that the calling signal being received is in the OFF state if a period of pulse signal constituting the calling signal is equal to or longer than the predetermined time period.

5. A method of closing a circuit which is configured to include a communication device and another communication device via a communication circuit network therebetween, a voice communication being enabled between the communication device and the other communication device via the communication circuit network when the circuit is closed, the method comprising the steps of:
    first detecting whether a calling signal is received from the other communication device via the communication circuit network;
    receiving a communication starting operation performed by a user after the step of the first detecting;
    second detecting whether the calling signal being received is currently in an ON state or an OFF state after the communication starting operation is received in the step of the receiving;
    awaiting closing of the circuit until the calling signal becomes the OFF state if the ON state of the calling signal is detected in the step of the second detecting; and
    closing the circuit without waiting if the OFF state of the calling signal is detected in the step of the second detecting.

6. The method according to claim 5, wherein the closing of the circuit is awaited in the step of the awaiting for a predetermined standby period after the OFF state of the calling signal is detected in the step of the second detecting.

7. The method according to claim 5, wherein the calling signal being received is detected in the step of the second detecting as being either in the ON state or the OFF state based on a period of a pulse signal constituting the calling signal.

8. The method according to claim 7, wherein the calling signal is detected in the step of the second detecting as being in the ON state if a period of pulse signal constituting the calling signal is shorter than a predetermined time period, and
    wherein the calling signal is detected in the step of the second detecting as being in the OFF state if a period of pulse signal constituting the calling signal is equal to or longer than the predetermined time period.

9. A computer-readable medium having a program stored thereon, the program comprising computer accessible instructions that cause a computer to carry out a method of closing a circuit which is configured to include the computer sewing as a communication device and another communication device via a communication circuit network therebetween, a voice communication being enabled between the communication device and the other communication device via the communication circuit network when the circuit is closed, the instruction defining the steps of:

first detecting whether a calling signal is received from the other communication device via the communication circuit network;

receiving a communication staffing operation performed by a user after the step of the first detecting;

second detecting whether the calling signal being received is currently in an ON state or an OFF state after the communication starting operation is received in the step of the receiving;

awaiting closing of the circuit until the calling signal becomes the OFF state if the ON state of the calling signal is detected in the step of the second detecting; and closing the circuit without waiting if the OFF state of the calling signal is detected in the step of the second detecting.

10. The computer readable medium according to claim 9, wherein the closing of the circuit is awaited in the step of the awaiting for a predetermined standby period after the OFF state of the calling signal is detected in the step of the second detecting.

11. The computer readable medium according to claim 9, wherein the calling signal being received is detected in the step of the second detecting as being either in the ON state or the OFF state based on a period of a pulse signal constituting the calling signal.

12. The computer readable medium according to claim 11, wherein the calling signal is detected in the step of the second detecting as being in the ON state if a period of pulse signal constituting the calling signal is shorter than a predetermined time period, and wherein the calling signal is detected in the step of the second detecting as being in the OFF state if a period of pulse signal constituting the calling signal is equal to or longer than the predetermined time period.

13. A communication device enabling a voice communication with another communication device connected to a communication circuit network, comprising:

a circuit closing system configured to close a circuit connecting the communication device and the other communication device;

a calling signal detection system that detects whether a calling signal is received from the other communication device via the communication circuit network;

a notifying system that notifies a user of receipt of the calling signal;

an operable member that enables the user to carry out a communication staffing operation when the notifying system notifies of the receipt of the calling signal;

a state detection system that detects whether the calling signal being received is currently in an ON state or an OFF state after the user has operated the operable member to carry out the communication staffing operation; and a closing control system that controls the circuit closing system to await closing the circuit if the communication starting operation has been carried out and the state detection system detects the ON state of the calling signal, the closing control system allowing the closing of the circuit if the communication starting operation has been carried out and the state detection system detects the OFF state of the calling signal.

14. The communication device according to claim 13, wherein the closing control system controls the circuit closing system to await closing the circuit for a predetermined period after the state detection system has detected the OFF state of the calling signal.

15. The communication device according to claim 13, wherein the state detection system detects whether the calling signal is in the ON state or the OFF state based on a period of a pulse signal constituting the calling signal.

16. The communication device according to claim 15, wherein the state detection system detects that the calling signal is in the ON state if a period of pulse signal constituting the calling signal is shorter than a predetermined time period, and wherein the state detection system detects that the calling signal is in the OFF state if a period of pulse signal constituting the calling signal is equal to or longer than the predetermined time period.

17. A system for closing a circuit which is configured to include a communication device and another communication device via a communication circuit network therebetween, a voice communication being enabled between the communication device and the other communication device via the communication circuit network when the circuit is closed, the system comprising:

means for first detecting whether a calling signal is received from the other communication device via the communication circuit network;

means for second detecting whether the calling signal being received is currently in an ON state or an OFF state if a communication starting operation is performed by a user after the first detecting detects the calling signal;

means for awaiting closing of the circuit if the second detecting detects the ON state of the calling signal; and means for allowing the closing of the circuit if the second detecting detects the OFF state of the calling signal.

* * * * *

UNITED STATES PATENT AND TRADEMARK OFFICE
CERTIFICATE OF CORRECTION

PATENT NO. : 7,643,622 B2  Page 1 of 1
APPLICATION NO. : 11/175336
DATED : January 5, 2010
INVENTOR(S) : Tomohiro Ito It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 937 days.

should read (*) Notice: Subject to any disclaimer, the term of this patent is extended or adjusted under 35 U.S.C. 154(b) by 1,216 days.

In Column 13, Claim 9, Line 7:
Please replace "sewing" with --serving--.

Signed and Sealed this

Twenty-second Day of June, 2010

David J. Kappos
*Director of the United States Patent and Trademark Office*